(12) United States Patent
Xia et al.

(10) Patent No.: US 11,358,202 B2
(45) Date of Patent: Jun. 14, 2022

(54) INTEGRATED SHAPE/PROPERTY CONTROL METHOD FOR HOT POWER SPINNING OF A CYLINDRICAL PART BASED ON HOT PROCESSING MAP

(71) Applicant: South China University of Technology, Guangzhou (CN)

(72) Inventors: Qinxiang Xia, Guangzhou (CN); Ningyuan Zhu, Guangzhou (CN); Xiuquan Cheng, Guangzhou (CN); Gangfeng Xiao, Guangzhou (CN)

(73) Assignee: South China University of Technology, Guangzhou (CN)

( * ) Notice: Subject to any disclaimer, the term of this patent is extended or adjusted under 35 U.S.C. 154(b) by 517 days.

(21) Appl. No.: 16/498,449

(22) PCT Filed: Nov. 24, 2017

(86) PCT No.: PCT/CN2017/112819
§ 371 (c)(1),
(2) Date: Sep. 27, 2019

(87) PCT Pub. No.: WO2018/176870
PCT Pub. Date: Oct. 4, 2018

(65) Prior Publication Data
US 2021/0276067 A1    Sep. 9, 2021

(30) Foreign Application Priority Data
Mar. 28, 2017    (CN) .......................... 201710190026.0

(51) Int. Cl.
*G01N 3/18* (2006.01)
*B21D 22/16* (2006.01)
*B21D 37/16* (2006.01)

(52) U.S. Cl.
CPC ............. *B21D 22/16* (2013.01); *B21D 37/16* (2013.01); *G01N 3/18* (2013.01)

(58) Field of Classification Search
CPC ........... B21D 22/16; B21D 37/16; G01N 3/18
See application file for complete search history.

(56) References Cited

U.S. PATENT DOCUMENTS 5,578,555 A    11/1996    Duperray
5,816,493 A    10/1998    Pirkle

FOREIGN PATENT DOCUMENTS

CN    101201307 A    6/2008
CN    101579804 A    11/2009
(Continued)

OTHER PUBLICATIONS

Chinese Search Report dated Jan. 10, 2017, Application No. PCT/CN2017/112819.

*Primary Examiner* — Jamel E Williams
(74) *Attorney, Agent, or Firm* — The Dobrusin Law Firm, PC

(57) ABSTRACT

Provided is an integrated shape/property control method for hot power spinning of a cylindrical part based on a hot processing map. The method comprises: during the process of thermoplastic forming of a difficult-to-deform metal, performing a high-temperature mechanical property test on the metal material at a temperature and a strain rate range where dynamic recrystallization occurs; constructing, based on the power dissipation during the thermoplastic forming and a judging criterion for flow instability and on a flow stress-strain relation obtained from the high-temperature mechanical property test, power dissipation maps and flow instability maps at different strains, respectively; combining the power dissipation maps with the flow instability maps to obtain a hot processing map of the material; according to a profile of a power dissipation rate factor η and the flow (Continued)

instability criterion, obtaining potential dangerous forming conditions met with the flow instability criterion, and safe forming conditions under which the power dissipation rate factor η is large and the thermoplastic forming is facilitated; and finally performing hot power spinning of the cylindrical part at the temperature and strain rate that facilitates the thermoplastic forming of the material according to the hot processing map.

10 Claims, 6 Drawing Sheets

(56) References Cited

FOREIGN PATENT DOCUMENTS

| | | | | |
|---|---|---|---|---|
| CN | 103499988 A | | 1/2014 | |
| CN | 104607519 A | * | 5/2015 | ............. B21D 22/16 |
| CN | 105537478 A | | 5/2016 | |
| CN | 105562573 A | | 5/2016 | |
| CN | 105651620 A | | 6/2016 | |
| CN | 107121992 A | | 9/2017 | |
| CN | 110538914 A | * | 12/2019 | ............. B21D 22/16 |

* cited by examiner

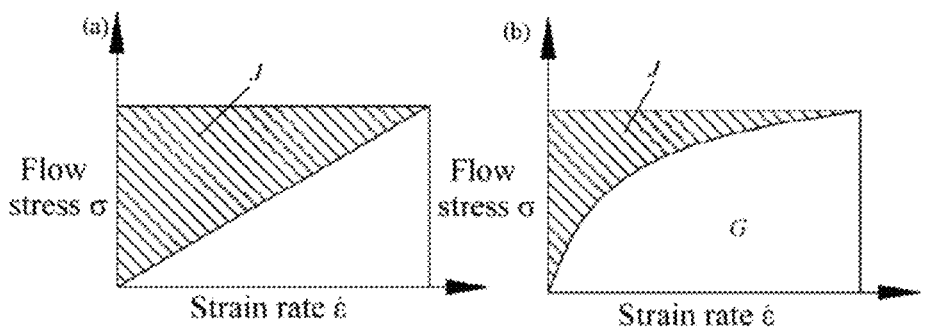

$$\dot{\varepsilon} = \frac{2}{\sqrt{3}} \frac{v_0 \sin \alpha_c}{t_0(1-\varphi_t)^2} \sqrt{1 - \frac{3}{4}(\frac{t_{\varphi f}}{t_f})\sin^2 \alpha_p}$$

Fig. 1

$$\begin{cases} P = \sigma \cdot \dot{\varepsilon} = G + J \\ G = \int_0^{\dot{\varepsilon}} \sigma d\dot{\varepsilon} \\ J = \int_0^{\sigma} \dot{\varepsilon} d\sigma \end{cases}$$

Fig. 2

$$m = \frac{\partial \ln \sigma}{\partial \ln \dot{\varepsilon}}\bigg|_{\varepsilon,T} = \frac{\dot{\varepsilon}\partial \sigma}{\sigma \partial \dot{\varepsilon}}\bigg|_{\varepsilon,T} = \frac{\partial J}{\partial G}$$

$$\eta = \frac{J}{J_{max}} = \frac{2J}{P} = \frac{2m}{m+1}$$

Fig. 5

$$\frac{\partial \left[\ln(\frac{m}{m+1})\right]}{\partial(\ln \dot{\varepsilon})} + m < 0$$

Fig. 6

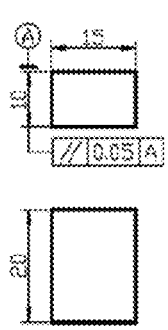
Fig. 9
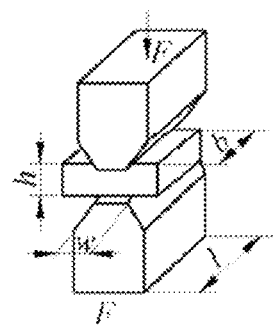
Fig. 10
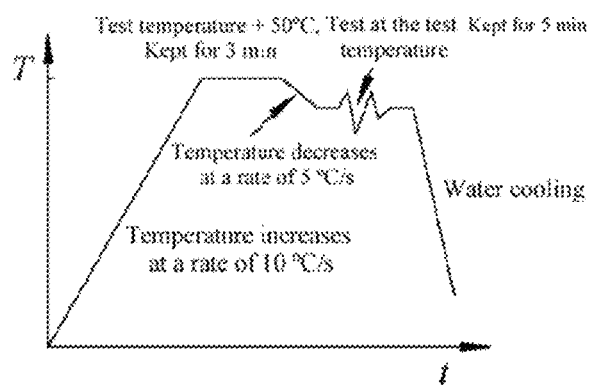
Fig. 11
$$\varepsilon = \frac{1}{A}\ln\left(\frac{h}{h-\Delta h}\right) \qquad \sigma = B\frac{F}{w \cdot b}$$
Fig. 12

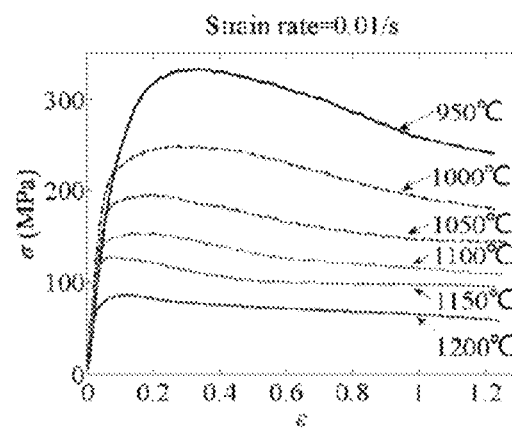
Fig. 13
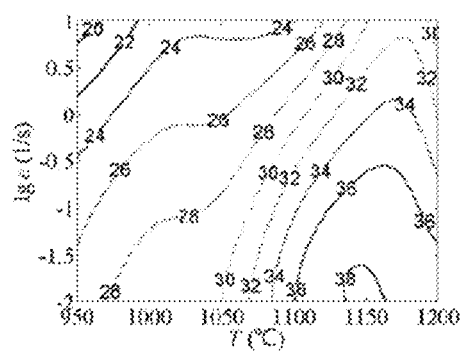
Fig. 14
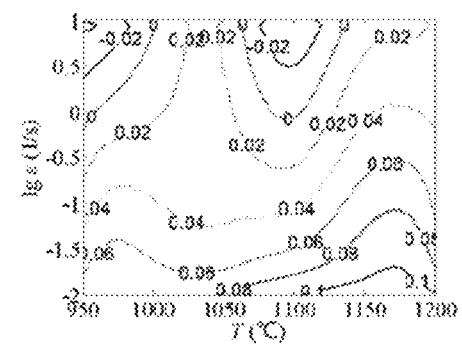
Fig. 15
Fig. 16

INTEGRATED SHAPE/PROPERTY CONTROL METHOD FOR HOT POWER SPINNING OF A CYLINDRICAL PART BASED ON HOT PROCESSING MAP

TECHNICAL FIELD

The present invention relates to a hot processing map, belonging to the field of thermoplastic forming of metal materials. More particularly, it relates to an integrated shape/property control method for hot power spinning of a cylindrical part based on a hot processing map.

BACKGROUND ART

On the basis of the requirements of dimensional accuracy of traditional plastic forming, it is proposed that the excellent mechanical properties of formed parts are the characteristics and development trend of the current plastic forming technology. With the development of high-level and advanced technologies in the aerospace, defense, ship and other industries, the application of cylindrical parts having both high dimensional accuracy and good high-temperature properties is becoming more and more widespread. However, such alloys have large deformation resistance and poor ductility at room temperature, so that it is extremely difficult to perform plastic forming at normal temperature. Hot power spinning with point-loading continuous local forming characteristics is one of the most effective methods for obtaining the cylindrical parts of such a difficult-to-deform metal. During hot power spinning, due to the thermal coupling effect, the forming mechanism is complex. How to control the forming temperature and the matching between various process parameters is the key to obtain the cylindrical parts having both high dimensional accuracy and good high-temperature properties.

In addition to the chemical composition of the material, the microstructure morphology is a determining factor in the material properties. Therefore, the microstructure evolution during hot power spinning is the key to determine the product properties. To study the mechanism of the microstructure evolution during hot power spinning, in conventional methods, the microstructure and texture are experimentally studied by using a optical microscope (OM), X-ray diffraction (XRD), electron back-scattered diffraction (EBSD), etc. However, due to the limitations of experimental means, it is impossible to realize the dynamic observation of the microstructure, which is difficult to predict and control based on experience, has a certain degree of blindness, and is time-consuming and labor-intensive.

Shape/property integrated control is an important development direction of plastic forming technologies. In terms of spinning forming, the current focus is on the research on the optimization of process parameters for macroscopic forming quality and spinning defect control. The researches on the mechanism of the microstructure evolution are also based on the aforementioned experimental method, only staying in the analysis of the microstructure after forming. The macroscopic forming quality and the microstructure evolution are not studied collaboratively, and no specific shape/property integrated control method is proposed based on the physical mechanism of microstructure evolution.

SUMMARY OF THE INVENTION

An object of the present invention is to overcome the aforementioned shortcomings and deficiencies of the prior art, and to provide an integrated shape/property control method for hot power spinning of a cylindrical part based on a hot processing map. Blind testing and material waste are avoided, and the property potential of the material is fully exploited. In the technical solutions of the present invention, both the macroscopic flow of the material during processing and the microstructure evolution of the material during deformation are considered, and the cylindrical part having both high dimensional accuracy and good mechanical properties is obtained.

The present invention is determined by the following technical solution:

an integrated shape/property control method for hot power spinning of a cylindrical part based on a hot processing map, comprising:

step (1): performing a high-temperature mechanical property test on a metal material at a temperature, a strain rate and a strain where dynamic recrystallization occurs, the temperature, strain rate and strain being dependent on the conditions required for dynamic recrystallization of the metal material during thermoplastic forming;

step (2): performing an interpolation calculation on a flow stress-strain relation obtained with a limited number of test temperatures and strain rates;

step (3): constructing, based on the power dissipation during the thermoplastic forming and a judging criterion for flow instability and on the expanded flow stress-strain relationship obtained from the high-temperature mechanical property test, power dissipation maps and flow instability maps at different strains, respectively;

step (4): combining the power dissipation maps with the flow instability maps to obtain a hot processing map of the material; according to a profile of a power dissipation rate factor $\eta$ and the flow instability criterion, obtaining potential dangerous forming conditions met with the flow instability criterion, and safe forming conditions under which the thermoplastic forming is facilitated by the power dissipation rate factor $\eta$; and step (5): finally determining hot power spinning parameters according to the temperature and strain rate that facilitates the thermoplastic forming of the material according to the hot processing map, to perform hot power spinning of the cylindrical part, so as to obtain a cylindrical part satisfying the requirements of dimensional accuracy and mechanical properties.

The metal material in preceding step (1) is a low-to-medium stacking-fault energy metal or alloy which is prone to dynamic recrystallization during thermoplastic forming; and the temperature of the high-temperature mechanical property test in step (1) ranges from 50° C. below the dynamic recrystallization temperature to 50° C. above the thermoplastic forming temperature of the material.

The hot processing map in preceding step (5) is a hot processing map based on a dynamic material model.

The strain rate of the high-temperature mechanical property test in preceding step (1) is selected within 0.01 s$^{-1}$-10 s$^{-1}$ according to the strain rate range during power spinning of cylindrical part; and the high-temperature mechanical property test in step (1) applies a strain amount of 0.6 or higher.

The interpolation calculation in preceding step (2) is to expand the number of temperature and strain rate samples.

A strain rate sensitivity coefficient m in the flow instability criterion in preceding step (3) is a partial derivative of the flow stress $\sigma$ with respect to the strain rate $\dot{\varepsilon}$, which determines the distribution between the energy G dissipated by the plastic deformation and the energy J dissipated by the microstructure evolution;

the work P done by an external force on the unit volume of the material per unit time during the processing of the material, i.e. the total energy obtained by the material which can be obtained by multiplying the stress σ and the strain rate $\dot{\varepsilon}$, is converted into the energy G consumed by the plastic deformation of the material and the energy J consumed by the microstructure evolution;

$$\begin{cases} P = \sigma \cdot \dot{\varepsilon} = G + J \\ G = \int_0^{\dot{\varepsilon}} \sigma d\dot{\varepsilon} \\ J = \int_0^{\sigma} \dot{\varepsilon} d\sigma \end{cases}$$

an ideal energy dissipation system assumes that the amounts of energy consumed by the plastic deformation and by the microstructure evolution are the same, but the material is typically in a nonlinear energy dissipation state; and to describe the energy distribution relationship, the partial derivative of the flow stress σ with respect to the strain rate $\dot{\varepsilon}$, i.e. the stain rate sensitivity coefficient m, is used to describe the distribution ratio:

$$m = \frac{\partial \ln \sigma}{\partial \ln \dot{\varepsilon}}\bigg|_{\varepsilon,T} = \frac{\dot{\varepsilon}\partial\sigma}{\sigma\partial\dot{\varepsilon}}\bigg|_{\varepsilon,T} = \frac{\partial J}{\partial G}.$$

The dangerous forming conditions in preceding step (4) are conditions under which the flow instability criterion described by the strain rate sensitivity coefficient m and based on the extremum principle of irreversible thermodynamics of large plastic deformation is satisfied;

based on the extremum principle of irreversible thermodynamics of large plastic deformation, the flow instability criterion is constructed by using a function of strain rate sensitivity coefficient m and strain rate:

$$\frac{\partial\left[\ln\left(\frac{m}{m+1}\right)\right]}{\partial(\ln \dot{\varepsilon})} + m < 0$$

the conditions under which the thermoplastic forming is facilitated are forming conditions under which the power dissipation rate factor η for describing the proportion of the energy J dissipated by the microstructure evolution is large; and the energy dissipated by the microstructure evolution is at the maximum when in the ideal linear energy dissipation system, $J_{max}=P/2$, so that according to the relationship between the total energy P obtained by the material and the dissipated energy, the power dissipation rate factor η can be described by a function of the strain rate sensitivity coefficient m to describe the proportion of the energy J dissipated by the microstructure evolution:

$$\eta = \frac{J}{J_{max}} = \frac{2J}{P} = \frac{2m}{m+1}.$$

The spinning temperature in preceding step (5) is to be controlled within a range of ±25° C. of a temperature for facilitating the thermoplastic forming obtained from the hot processing map.

The strain rate of the hot power spinning in preceding step (5) is determined by controlling the forming angle of a roller, the feed rate of the roller, the rotational speed of a spindle, the thinning ratio, and/or the wall thickness of a blank; and the hot power spinning parameters are determined, by means of calculation, according to a relationship between the strain rate $\dot{\varepsilon}$ of a power spinning deformation area of the cylindrical part, and the forming angle $\alpha_p$ of the roller, the wall thickness $t_0$ of the blank before spinning, the wall thickness $t_f$ of a workpiece after spinning, the wall thickness thinning ratio $\varphi_t$ and the feed speed $v_0$:

$$\dot{\varepsilon} = \frac{2}{\sqrt{3}} \frac{v_0 \sin \alpha_p}{t_0(1-\varphi_t)^2} \sqrt{1 - \frac{3}{4}\left(\frac{t_{\theta f}}{t_f}\right)\sin^2 \alpha_p}$$

where $\alpha_p$ is the forming angle of the roller; $t_0$ is the wall thickness of the blank before spinning; $t_f$ the wall thickness of the workpiece after spinning; $t_{\theta f}$ is the distance from different θ layers between an outer surface of the blank before spinning and an outer surface of the workpiece after spinning to an inner surface of the workpiece; $\varphi_t$ is the wall thickness thinning ratio; and $v_0$ is the flow velocity (relative to the roller) of a point mass in a forming zone before the roller, and in the backward spinning forming, $v_0$ is equal to the feed rate, which has a relationship $v_0$=f·n with the feed rate f and the rotational speed n of the spindle.

The conditions under which dynamic recrystallization occurs in step (1) mean that in the low-to-medium stacking-fault energy metal material in step (1), a recrystallization nucleus with an extremely low dislocation density is easily formed and grows at a grain boundary and a stress concentration site with a high dislocation density due to the fact that the dislocation density reaches a critical value during the thermoplastic forming, and this microstructure evolution process is called dynamic recrystallization in order to distinguish it from the recrystallization happened in heat treatment.

The determination of the dynamic recrystallization temperature and strain rate of the metal material is mainly influenced by many factors such as the microstructure state, chemical composition and forming approach of the material. For the strain rate, the forming approach is generally considered. In the present invention, the hot power spinning is used, and the strain rate thereof is typically within the range of $0.01\ s^{-1}$-$10\ s^{-1}$. For the dynamic recrystallization temperatures at different strain rates, reference can be made to the recrystallization temperatures in the heat treatment process, but the exact recrystallization temperature is mainly obtained by experiment.

Compared with the prior art, the present invention has the following advantages and effects:

1. the technical solutions used in the present invention can realize the integrated shape/property control of hot power spinning from the physical mechanism level;

2. the technical solutions used in the present invention can obtain a cylindrical part having both high dimensional accuracy and good microstructure properties; and 3. the technical solutions used in the present invention can obtain the dangerous forming conditions for the thermoplastic forming of the metal material, avoiding and reducing the forming defects.

It can be seen that the present invention is directed to a thin-walled cylindrical part of difficult-to-deform metal which not only has high-accuracy outer dimensions but also has a fine uniform grain with no flow instability such that the cylindrical part has good mechanical properties, and realizes an integrated control over the dimensional accuracy and mechanical properties of the cylindrical part of difficult-to-deform metal.

BRIEF DESCRIPTION OF THE DRAWINGS

FIG. 1 is a calculation formula of the strain rate of a power spinning deformation area of a cylindrical part.

FIG. 2 is the energy composition during thermoplastic forming.

FIG. 3 is an expression of a strain rate sensitivity coefficient.

FIG. 4 shows ideal linear and nonlinear energy dissipation distribution.

FIG. 5 is an expression of a power dissipation rate factor.

FIG. 6 is a judging criterion for flow instability based on the extremum principle of irreversible thermodynamics of large plastic deformation.

FIG. 9 is a diagram of a sample for a high-temperature plane strain compression test of the present invention.

FIG. 10 is a schematic view showing the loading in the high-temperature plane strain compression test of the present invention.

FIG. 11 is a graph showing the hot loading in a high-temperature mechanical property test of the present invention.

FIG. 12 show calculation formulas of the high-temperature plane strain compression flow stress and strain of the present invention.

FIG. 13 shows a flow stress-strain relation obtained by the high-temperature plane strain compression of the present invention.

FIG. 14 is a power dissipation map of the present invention.

FIG. 15 is a flow instability map of the present invention.

FIG. 16 is a hot processing map based on a dynamic material model of the present invention.

FIG. 17 shows a hot processing map and optical micrograph of Haynes 230 nickel-based superalloy at the strain of 1 of the present invention, wherein: FIG. 17a shows a hot processing map of Haynes 230 nickel-based superalloy at the strain of 1 of the present invention; FIG. 17b shows a first optical micrograph of Haynes 230 nickel-based superalloy at the strain of 1 of the present invention; FIG. 17c shows a second optical micrograph of Haynes 230 nickel-based superalloy at the strain of 1 of the present invention; and FIG. 17d shows a third optical micrograph of Haynes 230 nickel-based superalloy at the strain of 1 of the present invention.

DETAILED DESCRIPTION OF EMBODIMENTS

Figure 7:
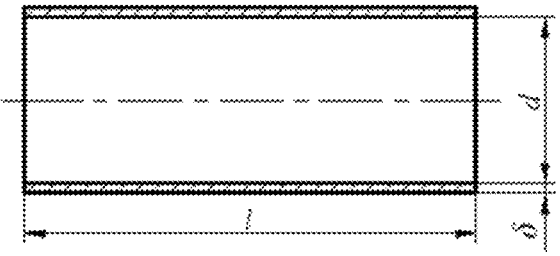
FIG. 7 is a flow chart implemented in the present invention.

The present invention will be further described below in conjunction with the accompanying drawings and embodiments, but the scope of protection of the present invention is not limited to the scope of the embodiments.

According to the calculation formula of the strain rate $\dot{\varepsilon}$ of a power spinning deformation area of a cylindrical part as shown in FIG. 1, the range of strain rates in a high-temperature mechanical property test is determined. According to the forming angle $\alpha_\rho$ of a roller during spinning forming, the wall thickness $t_0$ of a blank before spinning, the thickness $t_f$ of a workpiece after spinning, the distance $t_{\theta f}$ from different $\theta$ layers between an outer surface of the blank before spinning and an outer surface of the workpiece after spinning to an inner surface of the workpiece, a wall thickness thinning ratio $\varphi_t$, and a feed speed $v_0$, where the relationship between the feed speed $v_0$ and the feed rate f and the rotational speed n of a spindle is $v_0 = f \cdot n$, the strain rate $\dot{\varepsilon}$ of the power spinning deformation area of the cylindrical part is determined to be within the range of 0.01 s$^{-1}$-10 s$^{-1}$, typically 0.05 s$^{-1}$-5 s$^{-1}$. Therefore, it can be determined that the strain rate of the high-temperature mechanical property test can be selected within the range of 0.01 s$^{-1}$-10 s$^{-1}$.

The present invention uses a hot processing map based on a dynamic material model. The work P done by an external force on the unit volume of the material per unit time during the processing of the material is the total energy obtained by the material. According to the hot processing map based on the dynamic material model, the relationship between the work (energy) done by the external force and the energy consumed by the plastic deformation of the material is shown in FIG. 2. The total energy P obtained by the material can be expressed as the product of the stress $\sigma$ and the strain rate $\dot{\varepsilon}$, including two parts, namely a dissipation energy G, that is, the energy consumed by the plastic deformation, and a complementary dissipation energy J, that is, the energy consumed in the evolution of the microstructure, wherein the distribution of the dissipation energy G and the complementary dissipation energy J is determined by a strain rate sensitivity coefficient m as shown in FIG. 3.

When the material is in the ideal linear energy dissipation state, the strain rate sensitivity coefficient m=1, as shown in FIG. 4(a), at which time the complementary dissipation energy is at the maximum value $J_{max}$=P/2. In general, the material is in a non-linear energy dissipation state as shown in FIG. 4(b). Therefore, the power dissipation rate factor $\eta$ as shown in FIG. 5 is used to describe the proportion of the dissipation energy due to the microstructure evolution during the thermoplastic forming.

During the thermoplastic forming, the deformation and instability situations of the material mainly include: local plastic flow, formation of an adiabatic shear band, void nucleation around a hard spot, grain boundary wedge cracking, etc. This is determined in the hot processing map based on the dynamic material model by using the flow instability criterion based on the extremum principle of irreversible thermodynamics of large plastic deformation as shown in FIG. 6. When the instability criterion including the strain rate sensitivity coefficient m and the strain rate $\dot{\varepsilon}$ as shown in FIG. 6 is established, it indicates that there is a risk of instability under the conditions of this temperature T and strain rate $\dot{\varepsilon}$.

The flowchart of the implementation of the integrated shape/property control method for hot power spinning of a cylindrical part based on a hot processing map of the present invention is shown in FIG. 7.

Embodiment 1

Figure 8:
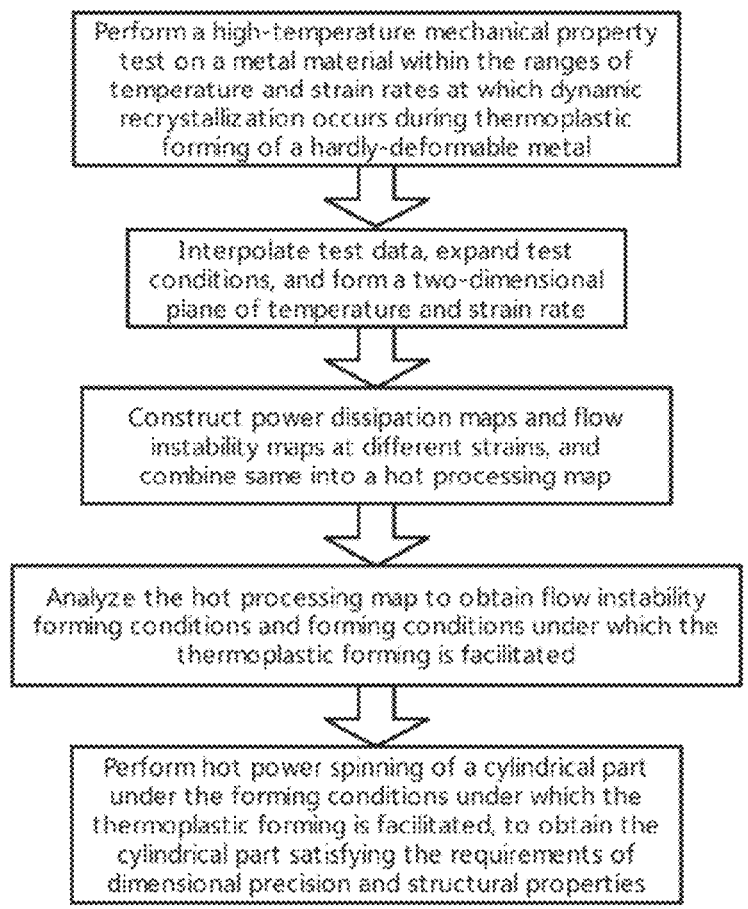
FIG. 8 is a schematic view of a cylindrical part obtained by hot power spinning of the present invention.

The material is a nickel-based superalloy of the name Haynes 230, which is a Ni—Cr—W—Mo solid-solution-strengthened low-stacking-fault-energy superalloy. The cylindrical part obtained by hot power spinning (as shown in FIG. 8) has an internal diameter d=54 mm, a wall thickness δ=2 mm, and a length l=500 mm.

1. This embodiment uses a high-temperature plane strain compression test to perform the high-temperature mechanical property test. A sample is processed into a rectangular parallelepiped sample of 10×15×20 mm³ as shown in FIG. 9 by wire cutting, and the loading mode during the test is as shown in FIG. 10.

2. Combined with literature and experiments, Haynes 230 nickel-based superalloy is determined to be at about 1000° C., and the temperature for high-temperature mechanical properties is therefore determined to be 950° C.-1200° C., selecting a level every 50° C. for a total of six levels; and according to the calculation formula of the strain rate $\dot{\varepsilon}$ of the power spinning deformation area of the cylindrical part as shown in FIG. 1, the strain rate is obtained in the range of 0.01 s⁻¹-10 s⁻¹, and therefore, the strain rates of the test are designed to be a total of four levels of 0.01 s⁻¹, 0.1 s⁻¹, 1 s⁻¹, 10 s⁻¹.

3. The test uses a single-factor test design method, and a total of 24 sets of tests are carried out on a Gleeble-3500 thermal simulation test machine. During the test, the sample is first heated at a rate of 10° C./s to a temperature greater than the temperature required for the test by 50° C., kept for 3 min such that the sample is evenly heated, then cooled at a rate of 5° C./s to the test temperature, kept for 5 min, and then subjected to plane strain high-temperature compression. During the compression process, the test machine controls the temperature of the sample to ensure isothermal compression. The sample is compressed until the amount of true stain is 1, and is then quenched in a water cooled manner, to retain the deformed structure as much as possible, so that the microstructure of the sample is conveniently studied. A thermal loading curve is shown in FIG. 11.

4. According to the test scheme, the high-temperature plane strain compression test is carried out. The true strain ε during the compression process is obtained according to the natural logarithm of the ratio of the thicknesses h and h−Δh of the sample before and after compression. The true stress σ is the ratio of the force F loaded by an anvil head to the product of the width w of the anvil head and the length b of the sample, that is, the ratio of the loading force F to the contact area w·b between the anvil head and the sample, and the calculation formula is shown in FIG. 12, given that the strain coefficient A and the stress coefficient B are 0.866. The obtained flow stress-strain relation is shown in FIG. 13.

5. Interpolation calculations are performed on the test data to extend the conditions of the limited 24 sets of tests to a two-dimensional plane of temperature to strain rate with a rational precision. According to the formula shown in FIG. 5, the profile of the obtained power dissipation rate factor η in the two-dimensional plane composed of the deformation temperature T and the strain rate $\dot{\varepsilon}$ is calculated and expressed in the form of an isoline, such that a power dissipation map at a certain strain as shown in FIG. 14 can be obtained. According to the formula shown in FIG. 6, the profile of the values of the flow instability criterion in the two-dimensional plane of the temperature and the strain rate is calculated, such that a flow instability map at a certain strain as shown in FIG. 15 is obtained. FIGS. 14 and 15 are combined, and the areas satisfying the flow instability criterion shown in FIG. 6 are represented by gray, such that the hot processing map of Haynes 230 alloy at the strain shown in FIG. 16 can be obtained simply and intuitively. The gray areas in the figure are flow instability areas, which are dangerous areas of plastic forming. The area with a large value of the power dissipation rate factor η is a safe area facilitating the thermoplastic forming.

Figure 17:
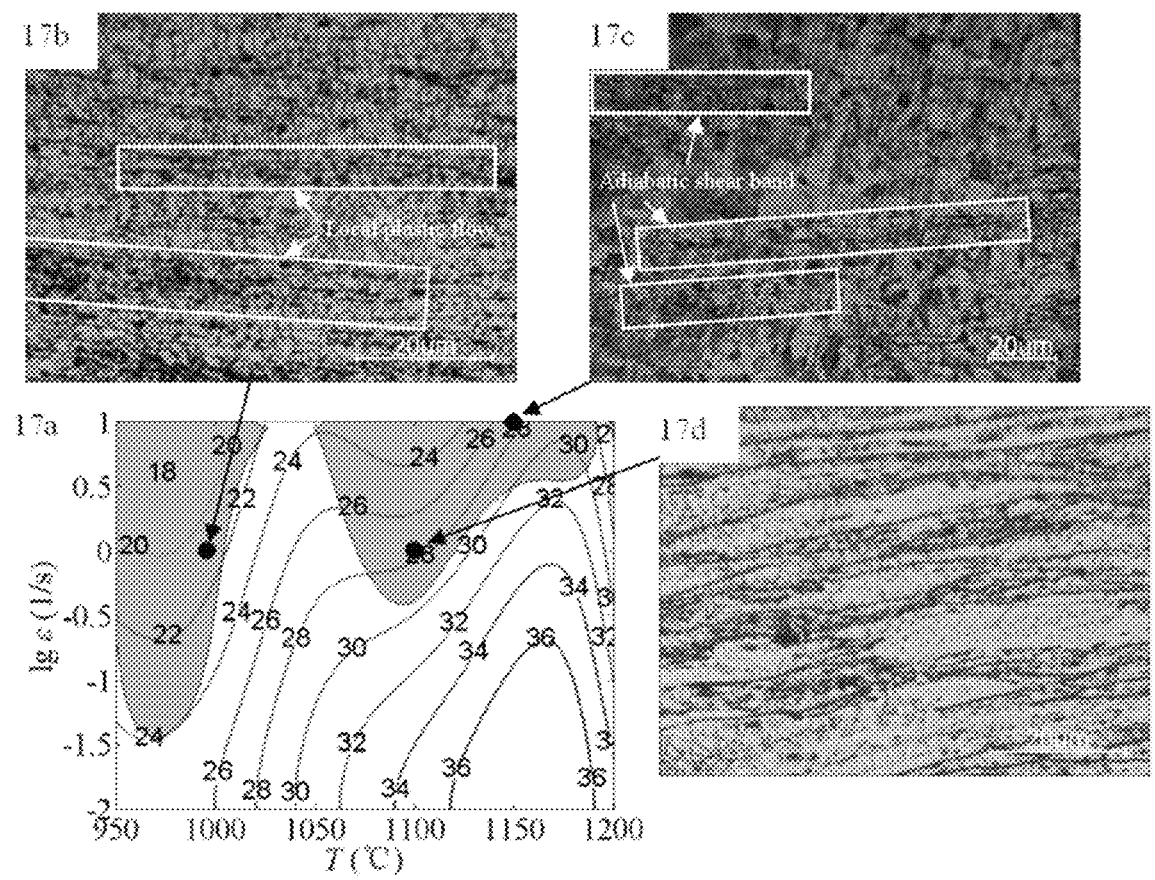

6. According to the above step 5, the hot processing map (as shown in FIG. 17) at the maximum strain (strain ε=1) in the mechanical property test of this embodiment is obtained, and the metallographic observation is performed on the sample in the flow instability areas, such that it is possible to determine the cause of the flow instability. The dangerous area of plastic forming for Haynes 230 nickel-based superalloy are obtained as follows: $\dot{\varepsilon}$>0.03 and T<1025° C.; and $\dot{\varepsilon}$>0.4 and 1050° C.<T<1200° C. The safe area facilitating the plastic forming is $\dot{\varepsilon}$<0.295 and T>1050° C.

Figure 18:
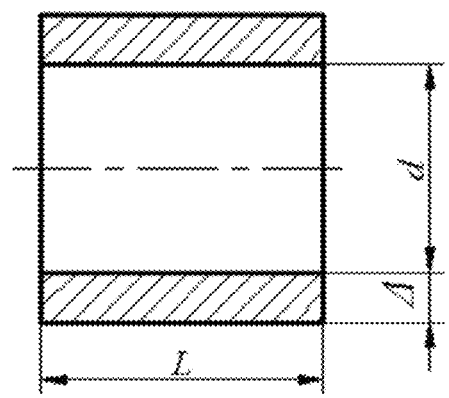
FIG. 18 is a schematic view of a blank of the cylindrical part formed by hot power spinning of the present invention.
Figure 19:
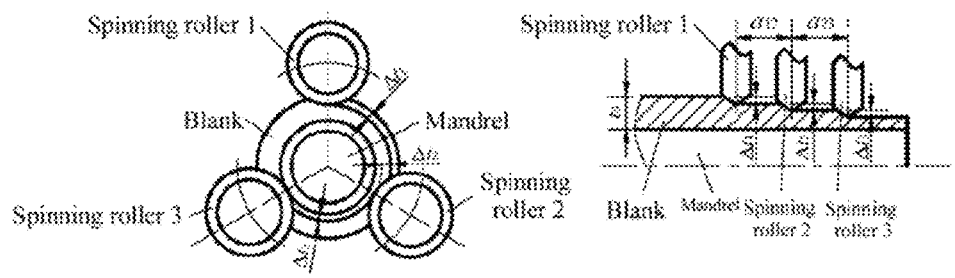
FIG. 19 is a schematic view of the three-roller backward stagger spinning forming of the present invention.

7. Hot power spinning is performed on the safe area facilitating the thermoplastic forming, which is determined according to the hot processing map. Since Haynes 230 nickel-based superalloy is produced by Haynes INC, USA, a blank of the cylindrical part having an internal diameter d=54 mm and a wall thickness Δ=5 mm as shown in FIG. 18 cannot be obtained. The hot power spun blank is obtained by wire cutting, and the wall thickness should be reduced from 5 mm to 2 mm during spinning, the thinning ratio is 60%. The length of the part is lengthened by 30 mm as the trimming allowance, and the length of the blank of the cylindrical part is determined to be L=200 mm (i.e.

$$\frac{[(54+2\times2)^2 - 68^2]\times(500+30)}{(54+2\times5)^2 - 54^2} \approx 200)$$

according to the principle of volume invariance. A spinning mandrel is designed to have a diameter of 54 mm and a length of 600 mm and mounted on a spindle of a vertical hot power spinning machine. The blank of the cylindrical part of the specification Ø54*5 and length L=200 mm is sheathed over the mandrel. A three-roller backward stagger spinning forming (as shown in FIG. 19) is used, and the amount of axial stagger interval is $a_{12}=a_{23}=2.5$ mm.

8. Three passes of spinning forming are performed, wherein the hot power spinning temperature is 1100° C., the rotational speed of the spindle is 100 r/min, the forming angle of the spinning roller is 20°, the feed rate is 0.6 mm/r, and the thinning ratios are 26%, 28%, 25%, respectively. It can be learnt from the calculation formula of the strain rate $\dot{\varepsilon}$ of deformation area during the power spinning of the cylindrical part shown in FIG. 1 that the strain rate is 0.13 s⁻¹-0.165 s⁻¹, which is in the plastic forming safe area of Haynes 230 nickel-based superalloy. High-efficiency and energy-saving electromagnetic induction heating is used during spinning, and real-time feedback control is performed by means of an infrared thermometer and a temperature control system to ensure that the temperature of the blank in a spinning area is within 1075° C.-1125° C.

9. After the spinning forming, the wall thickness deviation $\Psi_t$, the straightness $e_{straightness}$, and the ellipticity $e_{ellipticity}$ of the spun workpiece are measured as indicators for evaluating the dimensional precision. The wall thickness deviation $\Psi_t$ is the difference between the maximum and minimum wall thicknesses of the cylindrical part during a stable spinning state; the straightness $e_{straightness}$ is the distance of any plain line between two parallel planes of the smallest distance within a fixed length range of the measured cylindrical part; and the ellipticity $e_{ellipticity}$ is the difference between the maximum and minimum outer diameters of the cross-section of the cylindrical part during the stable spinning state. It is measured that the wall thickness deviation $\Psi_t$ of the spun workpiece is 0.107 mm, the straightness $e_{straightness}$ is 0.17 mm, and the ellipse $e_{ellipticity}$ is 0.20 mm, which satisfy the requirements of the part.

Figure 20:
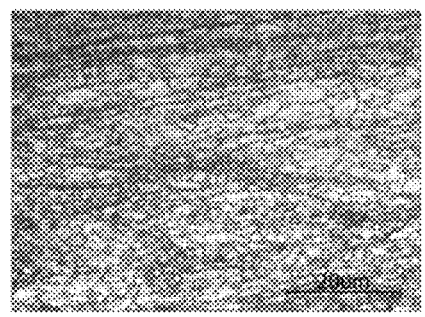
FIG. 20 shows a optical micrograph of Haynes 230 nickel-based superalloy subjected to the hot power spinning of the present invention.

10. After the spinning forming, the metallographic observation, the mechanical property test and microhardness measurement are performed, as indicators for evaluating the microstructure and mechanical properties of the spun workpiece. The spun workpiece is cut (15 mm from the opening) for test during the stable spinning state, is inlaid, ground and polished, and is then etched with a solution of HCl:HNO$_3$ of 3:1 for 3 minutes. The metallographic observation is performed on an MJ-42 optical microscope to obtain a fine uniform equiaxed completely recrystallized microstructure as shown in FIG. 20. The average diameter of grains is refined to 4.23 μm from 19.2 μm before spinning. The microhardness of the sample is measured on an HVS-1000Z microhardness meter after the metallographic observation. The average hardness of the blank before spinning is 191.14 HV, and the average hardness after spinning is increased to 315.74 HV. A uniaxial tensile mechanical property test is performed on the spun workpiece, the yield strength of which is increased to 1110 MPa from 480 MPa of the blank, and the tensile strength is remained basically unchanged at about 1200 MPa.

From this, it can be learnt that the cylindrical part of Haynes 230 nickel-base superalloy having good dimensional accuracy and excellent structural properties is obtained by the integrated shape/property control method for hot spinning of a cylindrical part based on a hot processing map of the present invention.

Embodiment 2

The material is 304 stainless steel, which is one of the most commonly used Cr—Ni stainless steels. The cylindrical part obtained by hot power spinning (as shown in FIG. 8) has an internal diameter d=50 mm, a wall thickness δ=2 mm, and a length l=500 mm.

Figure 21:
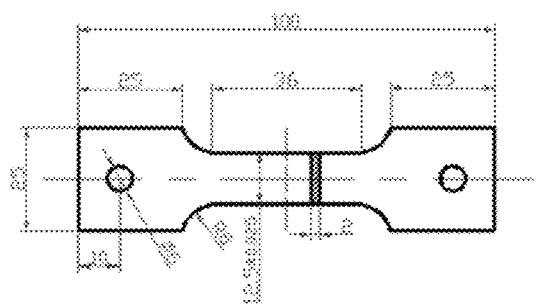
FIG. 21 is a diagram of a high-temperature uniaxial tensile sample of the present invention.

1. This embodiment uses a high-temperature uniaxial tensile test to perform the high-temperature mechanical property test. A sample is processed into a high-temperature uniaxial tensile sample as shown in FIG. 21 by wire cutting.

2. Combined with literature and experiments, the dynamic recrystallization temperature of 304 stainless steel is determined to be at about 950° C., and the temperature for high-temperature mechanical properties is therefore determined to be 900° C.-1100° C., selecting a level every 50° C. for a total of five levels; and the strain rates of the test are equally designed to be a total of four levels of 0.01 s$^{-1}$, 0.1 s$^{-1}$, 1 s$^{-1}$, 10 s$^{-1}$.

3. The test uses a single-factor test design method, and a total of 20 sets of tests are carried out on a Gleeble-3500 thermal simulation test machine. A resistance heating approach is used during the test, and the heat loading curve is shown in FIG. 11. A tensile deformation segment is first heated at a rate of 10° C./s to a temperature greater than the temperature required for the test by 50° C., kept for 3 min such that the sample is evenly heated, then cooled at a rate of 5° C./s to the test temperature, kept for 5 min, then subjected to the uniaxial tensile test until the sample is broken, and is then quenched in a water cooled manner.

4. Interpolation calculations are performed on the test data to extend the conditions of the limited 20 sets of tests to a two-dimensional plane of temperature to strain rate with a rational precision. According to the formula shown in FIG. 5, the calculated power dissipation rate factor η is expressed in the form of an isoline, such that a power dissipation map at a certain strain similar to that shown in FIG. 14 is obtained. According to the formula shown in FIG. 6, the profile of the values of the flow instability criterion in the two-dimensional plane of the temperature and the strain rate is calculated, such that a flow instability map at a certain strain similar to that shown in FIG. 15 is obtained. The power dissipation map and the flow instability map are combined, and the areas satisfying the flow instability criterion shown in FIG. 6 are represented by gray, such that the hot processing map similar to that shown in FIG. 16 can be obtained simply and intuitively. The gray areas in the figure are flow instability areas, which are dangerous areas of plastic forming. The area with a large value of the power dissipation rate factor η is a safe area facilitating the thermoplastic forming. The plastic forming danger areas of 304 stainless steel are obtained as follows: $0.1<\dot{\varepsilon}<1$ and 900° C.$<$T$<$1000° C.; and $\dot{\varepsilon}>1$ and 1000° C.$<$T$<$1100° C. The safe area facilitating the plastic forming is $\dot{\varepsilon}<0.5$ and 1000° C.$<$T$<$1100° C.

5. Hot power spinning is performed on the safe area facilitating the thermoplastic forming, which is determined according to the hot processing map. Since tube blanks of 304 stainless steel having an internal diameter d=50 mm and a wall thickness Δ=5 mm can be purchased on the market, the tube blanks of the relevant size are directly purchased for hot power spinning. The length of the part is lengthened by 30 mm as the trimming allowance, and the length of the blank of the cylindrical part is determined to be L=200 mm (i.e.

$$\frac{[(54+2\times 2)^2 - 68^2]\times(500+30)}{(54+2\times 5)^2 - 54^2} \approx 200)$$

according to the principle of volume invariance. A spinning mandrel is designed to have a diameter of 50 mm and a length of 600 mm and mounted on a spindle of a vertical hot spinning machine. The blank of the cylindrical part of the specification Ø50*5 and length L=200 mm is sheathed over the mandrel. A three-roller backward stagger spinning forming (as shown in FIG. 19) is used, and the amount of axial stagger interval is $a_{12}=a_{23}=2.5$ mm.

6. The wall thickness of the blank is reduced from 5 mm to 2 mm during the hot power spinning, the thinning ratio is 60%. Three passes of spinning forming are performed, wherein the hot power spinning temperature is 1050° C., the rotational speed of the spindle is 100 r/min, the forming angle of the spinning roller is 20°, the feed rate is 0.4 mm/r, and the thinning ratios are 26%, 28%, 25%, respectively. It can be learnt from the calculation formula of the strain rate $\dot{\varepsilon}$ of the deformation area during power spinning of the cylindrical part shown in FIG. 1 that the strain rate is 0.088 s$^{-1}$-0.11 s$^{-1}$, which is in the plastic forming safe area of 304 stainless steel. High-efficiency and energy-saving electromagnetic induction heating is used during spinning, and real-time feedback control is performed by means of an infrared thermometer and a temperature control system to ensure that the temperature of the blank in a spinning area is within 1025° C.-1075° C.

7. After the spinning forming, the wall thickness deviation $\Psi_t$, the straightness $e_{straightness}$, and the ellipticity $e_{ellipticity}$ of the spun workpiece are measured as indicators for evaluating the dimensional precision. It is measured that the wall thickness deviation $\Psi_t$ of the spun workpiece is 0.102 mm, the straightness $e_{straightness}$ is 0.11 mm, and the ellipse $e_{ellipticity}$ is 0.13 mm, which satisfy the requirements of the part.

8. After the spinning forming, the metallographic observation and the mechanical property test are performed, as indicators for evaluating the microstructure and mechanical properties of the spun workpiece. The spun workpiece is cut (15 mm from the opening) for test during the stable spinning stage, is inlaid, ground and polished, and is then etched with a solution of $HCl:HNO_3$ of 3:1 for 3 minutes. The metallographic observation is performed on an MJ-42 optical microscope to obtain a fine uniform, somewhat fibrous structure. The average diameter of crystal grains thereof is refined to 2.26 μm from 13.03 μm before spinning. A uniaxial tensile mechanical property test is performed on the spun workpiece, the yield strength of which is increased to 560 MPa from 269 MPa of the blank, the tensile strength is increased from 705 MPa to 846 MPa, and the elongation is remained at about 40%.

From this, it can be learnt that the cylindrical part having good dimensional accuracy and excellent structural properties is obtained by the integrated shape/property control method for hot power spinning of a cylindrical part based on a hot processing map of the present invention.

As described above, the present invention can be preferably implemented.

The embodiments of the present invention are not limited to the above embodiments. Any other changes, modifications, substitutions, combinations or simplifications made without departing from the spirit essence and principle of the present invention shall be equivalent replacements, and shall be comprised within the protection scope of the present invention.

The invention claimed is:

1. An integrated shape/property control method for hot power spinning of a cylindrical part based on a hot processing map, comprising:
   step (1): performing a high-temperature mechanical property test on a metal material at a temperature, a strain rate and a strain where dynamic recrystallization occurs, the temperature, strain rate and strain being dependent on the conditions required for dynamic recrystallization of the metal material during thermoplastic forming;
   step (2): performing an interpolation calculation on a flow stress-strain relation obtained with a limited number of test temperatures and strain rates;
   step (3): constructing, based on the power dissipation during the thermoplastic forming and a judging criterion for flow instability and on the expanded flow stress-strain relation obtained from the high-temperature mechanical property test, power dissipation maps and flow instability maps at different strains, respectively;
   step (4): combining the power dissipation maps with the flow instability maps to obtain a hot processing map of the material; according to a profile of a power dissipation rate factor η and the flow instability criterion, obtaining potential dangerous forming conditions met with the flow instability criterion, and forming conditions of safe forming conditions under which the thermoplastic forming is facilitated with the power dissipation rate factor η; and
   step (5): finally determining spinning parameters at the temperature and strain rate that facilitates the thermoplastic forming of the material according to the hot processing map, to perform hot power spinning of the cylindrical part, so as to obtain a cylindrical part satisfying the requirements of dimensional precision and structural properties.

2. The integrated shape/property control method for hot power spinning of a cylindrical part based on a hot processing map according to claim 1, characterized in that, the metal material in step (1) is a medium/low stacking fault energy metal or alloy which is susceptible to dynamic recrystallization during thermoplastic forming; and the temperature of the high-temperature mechanical property test in step (1) ranges from 50° C. below the dynamic recrystallization temperature to 50° C. above the thermoplastic forming temperature of the material.

3. The integrated shape/property control method for hot power spinning of a cylindrical part based on a hot processing map according to claim 1, characterized in that, the hot processing map in step (5) is a hot processing map based on a dynamic material model.

4. The integrated shape/property control method for hot power spinning of a cylindrical part based on a hot processing map according to claim 1, characterized in that, the strain rate of the high-temperature mechanical property test in step (1) is within $0.01\ s^{-1}$-$10\ s^{-1}$ of a power spinning strain rate profile range of the cylindrical part; and the high-temperature mechanical property test in step (1) applies a strain amount of 0.6 or higher.

5. The integrated shape/property control method for hot power spinning of a cylindrical part based on a hot processing map according to claim 1, characterized in that, the interpolation calculation in step (2) is to expand the number of temperature and strain rate samples.

6. The integrated shape/property control method for hot power spinning of a cylindrical part based on a hot processing map according to claim 1, characterized in that, a strain rate sensitivity coefficient m in the flow instability criterion in step (3) is a partial derivative of the flow stress σ with respect to the strain rate $\dot{\varepsilon}$, which determines the distribution between the energy G dissipated by the plastic deformation and the energy J dissipated by the microstructure evolution;
   the work P done by an external force on the unit volume of the material per unit time during the processing of the material, i.e. the total energy obtained by the material, is obtained by multiplying the stress σ and the strain rate $\dot{\varepsilon}$, which is in turn converted into the energy G consumed by the plastic deformation of the material and the energy J consumed by the microstructure evolution;

$$\begin{cases} P = \sigma \cdot \dot{\varepsilon} = G + J \\ G = \int_0^{\dot{\varepsilon}} \sigma d\dot{\varepsilon} \\ J = \int_0^{\sigma} \dot{\varepsilon} d\sigma \end{cases}$$

an ideal energy dissipation system assumes that the amounts of energy consumed by the plastic deformation and by the microstructure evolution are the same, but the material is typically in a nonlinear energy dissipation state; and to describe the energy distribution relationship, the partial derivative of the flow stress σ with respect to the strain rate $\dot{\varepsilon}$, i.e. the stain rate sensitivity coefficient m, is used to describe the distribution ratio:

$$m = \frac{\partial \ln \sigma}{\partial \ln \dot{\varepsilon}}\bigg|_{\varepsilon,T} = \frac{\dot{\varepsilon}\partial \sigma}{\sigma \partial \dot{\varepsilon}}\bigg|_{\varepsilon,T} = \frac{\partial J}{\partial G}.$$

7. The integrated shape/property control method for hot power spinning of a cylindrical part based on a hot processing map according to claim 1, characterized in that, the dangerous forming conditions in step (4) are conditions under which the flow instability criterion described by the strain rate sensitivity coefficient m and based on the extremum principle of irreversible thermodynamics of large plastic deformation is satisfied;

based on the extremum principle of irreversible thermodynamics of large plastic deformation, the flow instability criterion is constructed by using a function of strain rate sensitivity coefficient m and strain rate:

$$\frac{\partial\left[\ln\left(\frac{m}{m+1}\right)\right]}{\partial(\ln \dot{\varepsilon})} + m < 0$$

the conditions under which the thermoplastic forming is facilitated are that the power dissipation rate factor η for describing the proportion of the energy J dissipated by the microstructure evolution is large; and the energy dissipated by the microstructure evolution is at the maximum in an ideal linear energy dissipation system, $J_{max}=P/2$, so that according to the relationship between the total energy P obtained by the material and the dissipated energy, the power dissipation rate factor η can be described by a function of the strain rate sensitivity coefficient m to describe the proportion of the energy J dissipated by the microstructure evolution:

$$\eta = \frac{J}{J_{max}} = \frac{2J}{P} = \frac{2m}{m+1}.$$

8. The integrated shape/property control method for hot power spinning of a cylindrical part based on a hot processing map according to claim 1, characterized in that, the temperature of the hot power spinning in step (5) is within a range of ±25° C. of a temperature for facilitating the thermoplastic forming according to the hot processing map.

9. The integrated shape/property control method for hot power spinning of a cylindrical part based on a hot processing map according to claim 1, characterized in that, the strain rate of the hot power spinning in step (5) is determined by controlling the forming angle of a roller, the feed ratio of the roller, the rotational speed of a spindle, the thinning rate, and/or the wall thickness of a blank; and the hot power spinning parameters are determined according to a relationship between the strain rate $\dot{\varepsilon}$ of a power spinning deformation area of the cylindrical part, and the forming angle $\alpha_\rho$ of the spinning roller, the wall thickness $t_0$ of the blank before spinning, the wall thickness $t_f$ of a workpiece after spinning, the wall thickness thinning rate $\varphi_t$ and the feed speed $v_0$:

$$\dot{\varepsilon} = \frac{2}{\sqrt{3}} \frac{v_0 \sin \alpha_\rho}{t_0(1-\varphi_t)^2} \sqrt{1 - \frac{3}{4}\left(\frac{t_{\theta f}}{t_f}\right)\sin^2 \alpha_\rho}$$

where $\alpha_\rho$ is the forming angle of the roller; $t_0$ is the wall thickness of the blank before spinning; $t_f$ the wall thickness of the workpiece after spinning; $t_{\theta f}$ is the distance from different θ layers between an outer surface of the blank before spinning and an outer surface of the workpiece after spinning to an inner surface of the workpiece; $\varphi_t$ is the wall thickness thinning rate; and $v_0$ is the flow velocity (relative to the roller) of a point mass in a forming zone before the roller, and in the backward spinning forming, $v_0$ is equal to the feed rate, which has a relationship $v_0=f \cdot n$ with the feed ratio f and the rotational speed n of the spindle.

10. The integrated shape/property control method for hot power spinning of a cylindrical part based on a hot processing map according to claim 1, characterized in that, the conditions under which dynamic recrystallization occurs in step (1) are that in the medium/low stacking fault energy metal material in step (1), a recrystallization nucleus with an extremely low dislocation density is easily formed and grows at a grain boundary and a stress concentration site with a high dislocation density due to the fact that the dislocation density reaches a critical value during the thermoplastic forming, and this structure evolution process is called dynamic recrystallization in order to distinguish it from the recrystallization happened in heat treatment.

* * * * *